United States Patent
Price et al.

(10) Patent No.: US 12,462,388 B2
(45) Date of Patent: Nov. 4, 2025

(54) SUB-OBJECT SEGMENTATION

(71) Applicant: Adobe Inc., San Jose, CA (US)

(72) Inventors: Brian Price, Pleasant Grove, UT (US); Tai-Yu Pan, Columbus, OH (US); Qing Liu, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 395 days.

(21) Appl. No.: 18/312,858

(22) Filed: May 5, 2023

(65) Prior Publication Data

US 2024/0371002 A1 Nov. 7, 2024

(51) Int. Cl.
*G06T 7/10* (2017.01)
*G06V 10/762* (2022.01)
*G06V 10/774* (2022.01)
*G06V 10/776* (2022.01)
*G06V 10/82* (2022.01)

(52) U.S. Cl.
CPC ............ *G06T 7/10* (2017.01); *G06V 10/762* (2022.01); *G06V 10/774* (2022.01); *G06V 10/776* (2022.01); *G06V 10/82* (2022.01); *G06T 2207/20021* (2013.01); *G06T 2207/20081* (2013.01); *G06T 2207/20084* (2013.01); *G06T 2207/20092* (2013.01)

(58) Field of Classification Search
CPC ....... G06T 2200/24; G06T 2207/20021; G06T 2207/20081; G06T 2207/20084; G06T 2207/20092; G06T 2207/20104; G06T 7/11; G06T 7/10; G06V 10/762; G06V 10/764; G06V 10/765; G06V 10/774; G06V 10/776; G06V 10/82; G06V 10/771
USPC ........................................................ 382/157
See application file for complete search history.

(56) References Cited

U.S. PATENT DOCUMENTS

| | | | |
|---|---|---|---|
| 2019/0392550 A1* | 12/2019 | Uchiyama | G06T 7/70 |
| 2023/0136913 A1* | 5/2023 | Zhao | G06T 9/008 |
| | | | 382/103 |
| 2024/0201832 A1* | 6/2024 | Price | G06V 10/82 |

OTHER PUBLICATIONS

Choudhury et al., "Unsupervised Part Discovery from Contrastive Reconstruction", 35th Conference on Neural Information Processing Systems, Mar. 21, 2022, pp. 1-15.
Faktor et al., "Co-Segmentation by Composition", CVF, 2013, pp. 1297-1304.
He et al., "PartImageNet: A Large, High-Quality Dataset of Parts", Dec. 16, 2022, pp. 1-17.
Liang et al., "Look into Person: Joint Body Parsing & Pose Estimation Network and A New Benchmark", Apr. 5, 2018, pp. 1-14.
Liu et al., "Learning Part Segmentation through Unsupervised Domain Adaptation from Synthetic Vehicles", Apr. 3, 2022, pp. 1-17.
Tritrong et al., "Repurposing GANs for One-shot Semantic Part Segmentation", Jul. 5, 2021, pp. 1-14.

* cited by examiner

*Primary Examiner* — Chineyere Wills-Burns
*Assistant Examiner* — Emmanuel Silva-Avina
(74) *Attorney, Agent, or Firm* — Nicholson De Vos Webster & Elliott LLP

(57) ABSTRACT

A method includes receiving an object mask of an object in an image. The method further includes generating a mask of a sub-object in the image using a machine learning model configured to receive the mask of the object. A first branch of the machine learning model predicts whether a pixel of the image belongs to a sub-object.

18 Claims, 8 Drawing Sheets

SUB-OBJECT SEGMENTATION

BACKGROUND

Digital tools allow artists to interact with objects in an image. To indicate an object to be interacted with, users use one of multiple tools to select an object of interest. The selection of the object of interest segments the object from the other objects of the image. Segmentation may be used to identify pixels that belong to objects/sub-objects by partitioning sets of similar pixels. For example, responsive to a user selection of an object of interest, using segmentation, a line delineates the object such that everything inside the line corresponds to the object, and everything outside the line does not correspond to the object.

SUMMARY

Introduced here are techniques/technologies that automatically perform sub-object segmentation based on a user selection of a sub-object of interest. A segmentation system may use a neural network architecture to segment one or more sub-object(s) in an image. For example, in some embodiments, the neural network architecture may be implemented as a modified Mask2Former architecture.

The modified neural network architecture is class agnostic, broadening the capability of the segmentation system to segment sub-objects that have not been learned during training. Specifically, the modified neural network architecture clusters features of sub-objects to create pseudo labels of sub-objects. The pseudo labels are determined in feature space such that the modified Mask2Former architecture learns clusters of similar features (e.g., features of sub-objects). Additionally, the sub-object pseudo labels are used to expand the training data fed to the modified Mask2Former architecture. Specifically, the modified Mask2Former architecture determines a likelihood of a pixel being a part of a sub-object using a modified multilabel classifier that determines an objectness score of each pixel belonging to a class agnostic cluster. Moreover, the modified neural network architecture is designed to receive an additional input such as an object mask input.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
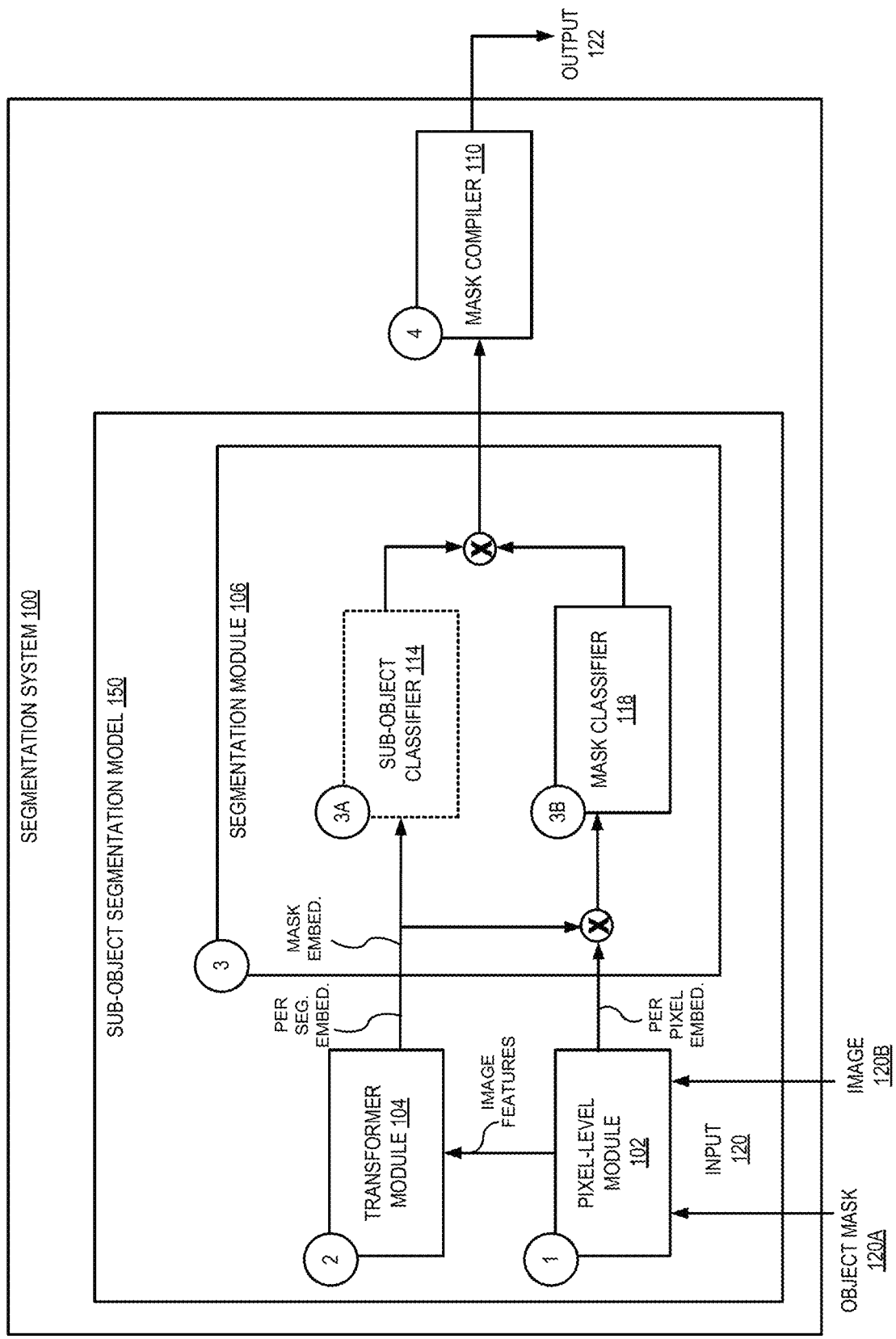
FIG. 1 illustrates a diagram of a process of segmenting one or more sub-objects, in accordance with one or more embodiments.

One or more embodiments of the present disclosure include a segmentation system that automatically performs sub-object segmentation by masking one or more sub-objects of an object in an image. Some conventional approaches identify known sub-objects of known objects in an image. That is, each sub-object identified is learned during training. Accordingly, these approaches are limited to identifying sub-objects learned during training. Additionally, these approaches identify sub-objects in every object in an image, as opposed to identifying a sub-object of a specific object in the image. For example, semantic segmentation is a segmentation method that segments each object (or sub-object) present in an image. Alternatively, panoptic segmentation is a segmentation method that segments objects as a whole (e.g., object level segmentation).

To address these and other deficiencies in conventional systems, the segmentation system of the present disclosure can automatically segment sub-objects of a specific object depicted in an input image. In some embodiments, the segmentation system performs segmentation in response to receiving an object mask of the specific object (otherwise referred to herein as the object mask) to be segmented into sub-objects. Automatically segmenting sub-object(s) refers to a determination of a sub-object of a particular object of interest without excessive user corrections/user input. Additionally, the segmentation system uses a class agnostic neural network model which enables the segmentation system to segment objects on which it has not been specifically trained. For example, the segmentation system is capable of segmenting unknown sub-objects of unknown objects. Similarly, the segmentation system is capable of segmenting unknown sub-objects of known objects. As a result, the segmentation system is able to segment sub-objects beyond the objects and sub-objects learned during training.

Using the segmentation system to automatically segment sub-objects of an object results in less time a user spends manually segmenting specific sub-objects of a specific object (e.g., a sub-object of interest in an object of interest). For example, the user does not have to use a digital tool and perform a gesture (such as selecting, lassoing, tracing, boxing, stroking, etc.) to indicate a sub-object of interest. Additionally, the user does not have to use the digital tool and perform a gesture to remove or discard extraneous segmented sub-objects associated with additional objects in the image.

By reducing the number of steps performed by the user and automatically segmenting sub-objects of an object, the user experience is improved. Moreover, automatically segmenting sub-objects reduces computing resources such as power, memory, and bandwidth, that a user would otherwise spend making multiple selections, responsive to extraneous or inaccurate sub-object segmentations. As described herein, a user naturally interacts with a sub-object to automatically segment the sub-object in the image. The segmented sub-object appears masked, or otherwise distinguishable from the other sub-objects/objects in the image.

FIG. 1 illustrates a diagram of a process of segmenting one or more sub-objects, in accordance with one or more embodiments. As shown in FIG. 1, embodiments include a segmentation system 100. The segmentation system 100 includes a sub-object segmentation model 150 and a mask compiler 110. The sub-object segmentation model 150 includes a pixel-level module 102, a transformer module 104, and a segmentation module 106. Specifically, the segmentation module 106 includes a sub-object classifier 114 and a mask classifier 118.

In some embodiments, the sub-object segmentation model 150 is a modified off-the-shelf neural network. For example, the segmentation model 150 may be a modified Mask2Former model. The present disclosure describes various modifications to specific components of the segmentation module 106 of the Mask2Former model. In other embodiments, the segmentation model 150 is a model including multiple sub-modules, each sub-module configured to perform the tasks of well-known modules such as the pixel-level module 102, the transformer module 104, and the other tasks described herein.

A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks within the segmentation system 100 are discussed below with respect to FIGS. 2 and 3.

At numeral 1, the pixel-level module 102 of the sub-object segmentation model 150 receives inputs 120 (not shown) including object mask 120A and/or image 120B. The image 120B may be a may be a computer-generated image, a frame of a video, a picture captured by a camera (or other sensor), a bitmap, and the like. The object mask 120 is a mask of a particular object of interest in the image 120B.

In some embodiments, the object mask 120 captures the object in the image 120B. For example, the object mask may be three channels such as red-green-blue that depicts the object in the image. In these embodiments, the pixel-level module 102 does not receive the image 120B and only receives the object mask 120A. In other embodiments, the pixel-level module 102 receives the object mask 120A and the image 120B. For example, the object mask 120A masks the object of the image 120B in a binary fashion. For instance, every pixel in the object is a first color (e.g., white), and everything that is not the object (e.g., the background) in the object mask 120A is a second color (e.g., black). Subsequently, the pixel-level module 102 receives a four-channel input 120 including the binary object mask 120A and a three-channel (e.g., red-green-blue) image 120B. In some implementations, the four-channel input is considered a single image representation.

The object (e.g., identified in the object mask 120) is an object of interest because it includes a sub-object of interest. For example, a user may select a portion (e.g., sub-object) of the object of interest. In some embodiments, a third-party tool (or other upstream process) generates the object mask and provides the mask to the segmentation system 100. In other embodiments, one or more components of the segmentation system 100 generate the object mask 120A from the image 120B. For example, a user selects an object in an image including a sub-object of interest. Responsive to the user selection of the object, a mask of the object is generated.

The pixel-level module 102 may include any one or more modules configured to extract image features from the input 120. In some embodiments, the pixel-level module 102 may be a feature-aligned pyramid network. Image features may be considered a low-resolution latent space representation of input 120, for instance. Such image features may be fed to the transformer module 104. Additionally, the pixel-level module 102 at numeral 1 may determine high resolution features. For example, the pixel-level module 102 may determine per-pixel embeddings (illustrated as "per pixel embed.")

At numeral 2, the transformer module 104 receives the image features and determines per segment embeddings (illustrated as "per seg. embed."). Each segment embedding corresponds to a position of the embedding in an embedding space of the object of interest. The per-segment embeddings are used to determine mask embeddings (illustrated as "mask embed.") in the segmentation module 106. For example, a multi-layer perceptron (MLP) of the segmentation module 106 (not shown) may generate mask embeddings from the per-segment embeddings.

At numeral 3, the segmentation module 106 segments sub-objects of the object of interest (e.g., the object mask 120). In some embodiments, at numeral 3A, a sub-object classifier 114 optionally classifies a pixel as belonging to a segment (otherwise referred to herein as a sub-object) of the object of interest using generic labels. If executed, the sub-object classifier 114 uses the mask embeddings to classify pixels as belonging to sub-objects according to a generic label, instead of classifying sub-objects according to a ground truth label. For example, the sub-object classifier 114 classifies pixels of a particular sub-object as likely belonging to "part 1" without identifying what "part 1" is. Because the sub-object classifier 114 is class agnostic, the accuracy of sub-object classifier 114 does not depend on learning ground truth labels of sub-objects. That is, the sub-object classifier 114 can classify unique sub-objects of an object of interest without such sub-objects being part of the training data.

In a particular example, instead of the sub-object classifier 114 performing multilabel classification on a set of predetermined/pretrained labels (as may be conventionally performed using the Mask2Former architecture), the sub-object classifier 114 predicts a likelihood of a pixel belonging to a sub-object using an objectness score. The objectness score (or in this case, a partness score, representing a score of a part/sub-object), measures a likelihood of a pixel (or a window including multiple pixels) being part of a sub-object (or a part of an object). An example factor for determining the objectness score include a measure of a unique appearance of a window of pixels. For example, the sub-object classifier 114 compares the density of unique pixels in a window of a sub-object to a density of pixels in the object. Another factor for determining the objectness score includes pixel color contrast. For example, the sub-object classifier 114 compares the color of pixels in a window to a color of pixels in a region around the window.

The segmentation module 106 optionally executes the sub-object classifier 114 because the segmentation system 100 does not depend on an accurate classification of a sub-object. That is, a user identifying a sub-object of interest likely does not need to know the classification of the sub-object (e.g., what the sub-object of interest is). However, it may be beneficial for the segmentation module 106 to execute the sub-object classifier 114 such that during training, losses can be propagated to the pixel-level module 102 and the transformer module 104.

Referring back to the per-pixel embeddings determined by the pixel-level module 102, a dot product is applied to the per-pixel embeddings and mask embeddings (determined by a MLP of the segmentation module 106, for instance) are fed to the mask classifier 118 at numeral 3B. At numeral 3B, the mask classifier 118 determines mask predictions of each sub-object of the object of interest. Specifically, the mask classifier 118 determines binary mask embeddings by masking (or classifying) each pixel in the object of interest as belonging to a sub-object of the object of interest.

At numeral 4, the mask compiler 110 receives a dot product of the binary mask embeddings and the sub-object classification (e.g., the class agnostic classification) and generates a mask understandable by humans. For example, the mask compiler 110 receives a probability distribution of each pixel belonging to a mask of a sub-object and converts the probabilities to a mask displayed to the user. Specifically, the mask compiler 110 displays the sub-object mask to the user by overlaying the sub-object with one or more visual indicators. Such overlayed visual indicators may be colors, patterns, and the like, displayed to the user.

Additionally or alternatively, instead of a probability distribution, the mask compiler 110 receives binary values of each pixel. For instance, pixels set to a value of "0" correspond to a low probability of a pixel belonging to a sub-object of an object while pixels set to a value of "1" correspond to a high probability of a pixel belonging to a sub-object of an object. Subsequently, the mask compiler 110 transforms the pixel values into colors (or a different visual indicator) to be displayed to a user. For example, pixels set to "1" are painted a particular color (and may include a particular translucence, brightness, opacity, etc.). In contrast, pixels set to "0" are painted a particular color (e.g., black). In this manner, the mask compiler 110 provides an output image (e.g., output 122) including masked sub-object(s), where the masked sub-object(s) include pixels of a particular color. In other embodiments, the output 122 is communicated to one or more devices for subsequent processing.

Figure 2:
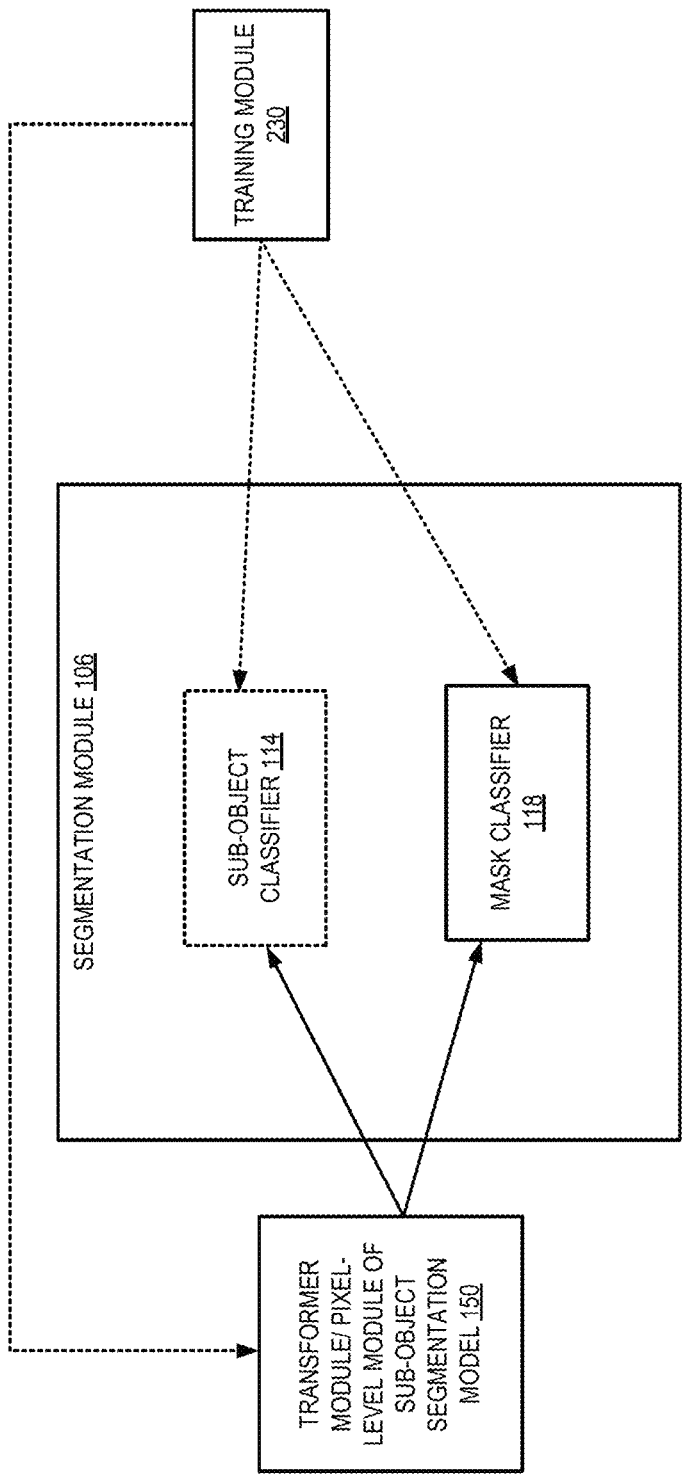
FIG. 2 illustrates training the multi-headed architecture of the segmentation system, in accordance with one or more embodiments.

FIG. 2 illustrates training the multi-headed architecture of the segmentation system 100, in accordance with one or more embodiments. Multitask learning is when a single ML model (e.g., the sub-object segmentation model 150) is trained to perform multiple tasks. The tasks performed by the sub-object segmentation model 150 include classifying pixels as belonging to a sub-object (via the sub-object classifier 114), and determining a mask of the sub-object (via the mask classifier 118). A model that is trained using multitask learning includes one or more shared "backbone" layers and "heads" dedicated to perform a specific task. Each head (sometimes referred to herein as "branches") include a machine learning model required to perform/learn the specific task associated with that head. That is, each head may utilize a unique loss function to train the particular head to perform a task. Multitask learning improves efficiency as each head receives the same set of features (or other information) determined from the shared portion of the ML model. That is, for a two-headed model, the features received by each head are computed once (e.g., by the shared backbone) instead of two times if each head of the model was its own machine learning model. This efficient sharing is useful in cases where the multitask model learns related tasks.

The shared backbone of the multitask learning model is shown as the transformer module 104 and pixel-level module 102 of the sub-object segmentation model 150. As described herein, various intermediate features are provided to the sub-object classifier 114 head and the mask classifier 118 head. For example, the sub-object classifier 114 predicts a probability of a pixel belonging to a class agnostic label using mask embeddings determined using per segment embeddings determined from the transformer module 104. The mask classifier 118 determines a probability of a pixel belonging to a sub-object mask using per pixel embeddings determined using the pixel level module 102 and mask embeddings determined using per segment embeddings determined from the transformer module 104. Each of the sub-object classifier 114 head and the mask classifier 118 head use the features to tune the output of the sub-object classifier 114 and mask classifier 118 respectively.

As described with reference to FIG. 3, the training module 230 is configured to provide training data such that the sub-object classifier 114 learns to predict a probability of a pixel belonging to a class agnostic label. Similarly, the training module 230 provides training data such that the mask classifier 118 masks sub-objects (e.g., predicts whether a pixel belonging to a mask of the sub-object). The training module 230 trains the sub-object classifier 114 and the mask classifier 118 (collectively referred to herein as ML heads) using supervised learning/self-supervised learning. During this learning, the training module 230 provides training data (e.g., input-output pairs) to the backbone (e.g., the transformer module and pixel-level module of the sub-object segmentation model 150) and to the sub-object classifier 114/mask classifier 118 (e.g., ML heads). In some embodiments, the error of each head is determined, and passed to the backbone such that the features determined by the backbone are tuned according to the error of each of the heads performing their respective tasks.

The training module 230 can obtain training data by querying one or more data stores (internal to the segmentation system 100 or external to the segmentation system 100) for datasets including masked sub-objects of objects. The datasets include clean images and corresponding images with masked sub-objects in an object. In some implementations, the dataset received by the training module 230 includes masks for many sub-objects of objects in an image and the training module 230 selects one masked sub-object in the image for use as training data. In other implementations, the training module 230 combines several sub-objects of the object to create masks of multiple sub-objects.

The training module 230 is also configured to obtain an object mask (e.g., object mask 120A). The object mask represents a mask from an upstream processing device, a historic mask (determined by one or more upstream processes and/or a user selection), or a noisy mask (synthetically generated by corrupting a mask and/or a user selection). The historic masks may be masks determined by the one or more upstream processes configured to generate masks and stored by the training module 230. The historic mask may also be a previous user selection of a group of pixels. Training the sub-object segmentation model 150 using such historic masks allows the ML heads to be trained with respect to the specific upstream processes that generated the object masks. That is, the transformer module 104, the pixel-level module 102, the sub-object classifier 114, and the mask classifier 118 will learn to correct the imperfections of the one or more upstream systems.

For example, an upstream machine learning model may be trained to generate a mask of an object in an image. By providing the sub-object classifier 114 and the mask classifier 118 the mask determined by the upstream machine learning model, the sub-object classifier 114, and the mask classifier 118 learn the types of mistakes generated by the upstream machine learning model and can correct such mistakes. In some embodiments, the training module 230 may obtain a historic mask and further corrupt the mask using any suitable method. By corrupting the historic mask, the training module 230 is training the ML heads to be robust to noise/errors received from the one or more upstream systems.

In some embodiments, the training module 230 is configured to generate an object mask by corrupting a masked object received from one or more data stores. The training module 230 may corrupt a received image including a masked object using any one or more suitable means of injecting noise into one or more objects of the image.

For example, the training module 230 injects noise into the object mask using one or more functions to create a shape and add/subtract the shape from a mask. For example, the training module 230 can add/remove pieces of the object mask by adding/removing the pixels belonging to an ellipse generated randomly along the object boundary. The addition or removal of such pixels simulates an imperfect mask received from one or more downstream processes and/or received at a previous iteration of the segmentation system 100. Additionally or alternatively, the addition or removal of such pixels simulates a user-captured group of pixels.

The training module 230 may also corrupt the object mask by applying one or more morphological operations to the mask. For example, the training module 230 may apply a dilation morphological operation, in which pixels are added to a boundary of the object, increasing the size of the object mask. The training module 230 may also apply an erosion morphological operation, in which pixels are removed along the boundary of the object, simulating missing portions of the mask.

Figure 3:
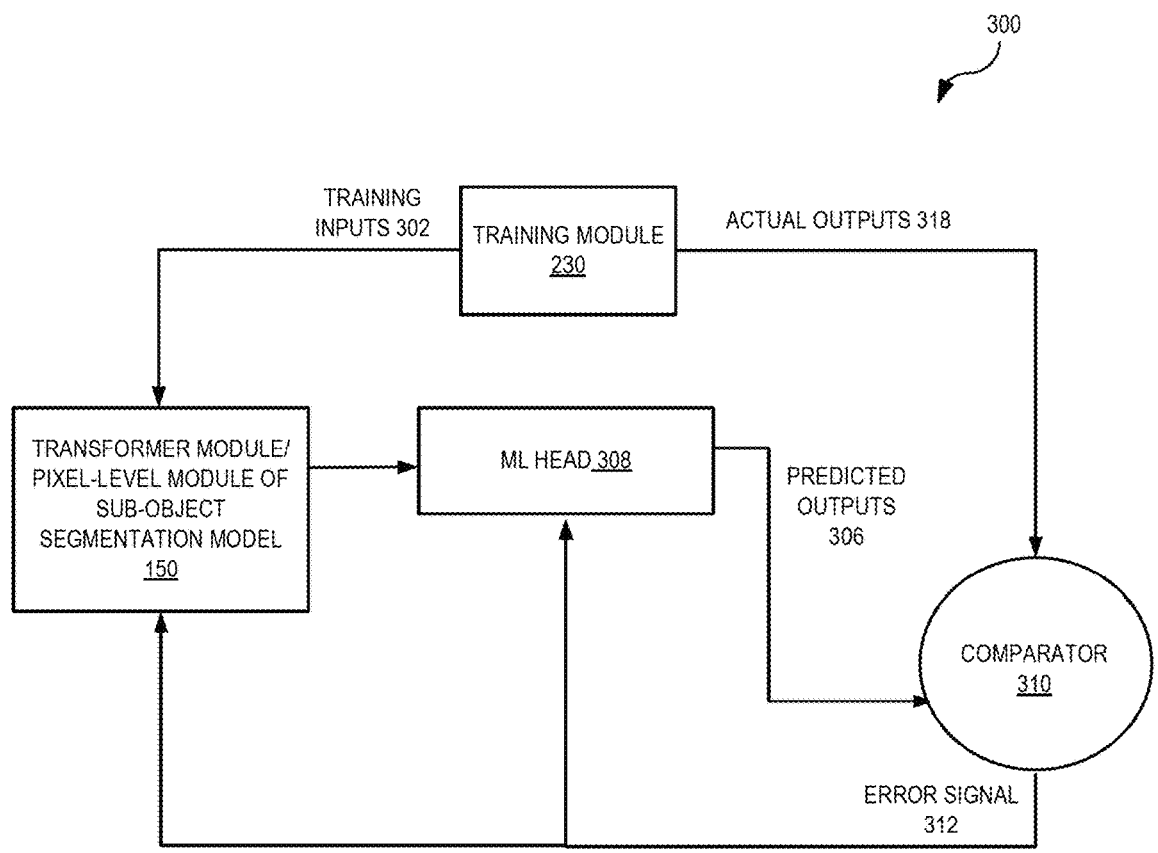
FIG. 3 illustrates an example process of supervised learning used to train the each of the ML heads, in accordance with one or more embodiments.

FIG. 3 illustrates an example process of supervised learning used to train the each of the ML heads, in accordance with one or more embodiments. Supervised learning is a method of training a machine learning model given input-output pairs. An input-output pair is an input with an associated known output (e.g., an expected output, a labeled output, a ground truth). For example, a training input 302 may be a masked object. As described herein, the masked object may be obtained from a data store, an upstream process, and the like. For example, the training module 230 may obtain a data set including clean images (used as part of the training inputs 302) and corresponding images with masked sub-objects in an object (used as the actual output 318). That is, the training data obtained from the data store identifies one or more sub-objects of an object.

As described herein, the training module 230 may corrupt the masked object by applying one or more morphological operations, for instance. In some embodiments, the corrupted masked object is provided as an input (e.g., training input 302), and one or more sub-objects of the non-corrupted masked object are provided as the actual outputs 318. As described herein, in some embodiments, sub-objects of an object are determined by the training module 230 using clustering. In these embodiments, the training module 230 may use any clustering technique such as k-means clustering.

The training module 230 can determine pairs of training data using clustering. Clustering is a technique to identify similar data in a group. As used herein, each cluster represents a sub-object of an object of interest and is associated with a centroid. In this manner, the training module 230 can identify pseudo labels (e.g., generic identifiers) corresponding to sub-objects of an object. For example, a first cluster may correspond to a first sub-object of an object and therefore labeled "part 1." As described herein, the sub-object labels may be class agnostic. The number of clusters may be a user configurable parameter. Increasing the user configurable parameter increases the number of clusters, which increases the sub-objects identified of an object.

The clustering process may be performed on features of each sub-object. The features clustered by the training module 230 may be determined using one or more neural networks. For example, the training module 230 may perform clustering on intermediate states of the sub-object by performing clustering on image features of the object of interest (e.g., determined by the pixel-level module 102), per-segment embeddings of the object of interest (determined by the transformer module 104), mask embeddings of the object of interest (determined using the per-segment embeddings), per-pixel embeddings of the object of interest (determined by the pixel-level module 102), pixels, and the like. Additionally or alternatively, the training module 230 can create clusters using other features of input 120. For example, the training module 230 can cluster RGB values or other non-machine learning features. For instance, the training module 230 can employ the scale-invariant feature transform (SIFT) algorithm to identify local features of input 120. By identifying clusters of similar features, the training module 230 identifies features corresponding to sub-objects of an object.

The training module 230 randomly generates a centroid and associates features with the centroid based on distances between features and the centroid. During each iteration of a clustering process, the training module 230 moves the centroid to a new relative location based on a distance (e.g., minimizing an average distance) of each feature associated with the centroid. In this manner, a distance of features associated with the same centroid is minimized and a distance of features associated with different centroids is maximized. In some configurations, the training module 230 measures the distances between the features and the centroids using Euclidean distance in embedding space. The distance between the features and the centroids may be indicated using a similarity score, where the closer the features are to the centroid, the higher the similarity score. The training module 230 may track the similarity scores between each of the features and centroids in a similarity matrix.

Each time the centroid moves, the training module 230 recalculates the distance between the features of the object and the centroid(s). The training module 230 iterates the clustering process until a stopping criteria is met (e.g., a threshold number of features do not change clusters, the sum of the distances is minimized, a maximum number of iterations is reached).

In some embodiments, the training module 230 performs one or more spatial manipulations to the image data and performs (or re-performs) the clustering process. For example, the training module 230 may perform geometric augmentations such as horizontally flipping the image, mirroring the image, and the like. The training module 230 may also perform color-jittering such that the pixels of the image are brightened, dimmed, or otherwise adjusted. In this manner, the training module 230 improves the likelihood that the clustered features belong to unique sub-objects.

By identifying features of clusters, the training module 230 creates pseudo labels in a class agnostic manner (e.g., features of cluster one belong to "part 1"). Such pseudo labels can be used as actual outputs 318 during training (e.g., in supervised learning). For example, the generated pseudo labels correspond to unknown (e.g., unlabeled) sub-objects of an object in an image (e.g., the training input 302).

The training module 230 is used to train the sub-object classifier 114 on input-outputs pairs such that the sub-object classifier 114 learns how to predict outputs (e.g., class agnostic sub-object labels) given known inputs (e.g., the masked object). Similarly, the training module 230 is used to train the mask classifier 118 to learn how to predict known outputs (e.g., a probability distribution of pixels belonging to a sub-object) given known inputs (e.g., the masked object). The training module 230 can also train the transformer module 104 and pixel-level module 102 based on the accuracy of ML heads 308 (e.g., the sub-object classifier 114 and the mask classifier 118).

To train the sub-object classifier 114 and the mask classifier 118, (e.g., ML heads 308), the training module 230 provides a masked object (e.g., an image with a segmented or otherwise distinguishable object) to the transformer module 104 and pixel-level module 102 as a training input 302. As described herein, the pixel-level module 102 determines image features, which are fed to the transformer module 104. The transformer module 104 determines per segment embeddings. Such per segment embeddings are converted into mask embeddings using one or more classifiers such as a multi-layer perceptron.

Using the mask embeddings, the sub-object classifier 114 predicts labels (e.g., class probabilities) of each segment. As described herein, such labels (or classes) are class agnostic such that the sub-object classifier 114 predicts the probability of each pixel belonging to a class (e.g., a sub-object) using an objectness score. The probability of each pixel being part of a subject is the predicted output 306.

Using the mask embeddings and per pixel embeddings determined by the pixel-level module 102, the mask classifier 118 predicts a mask of a sub-object. In some embodiments, the prediction of the mask is a binary classification of each pixel in the image belonging to the sub-object of the object. For example, pixels classified with "0" do not belong in the predicted mask output (e.g., predicted output 306), and pixels classified with "1" do belong in the predicted mask output (e.g., predicted output 306).

The sub-object classifier 114 (e.g., ML head 308) predicts output 306 by applying the current state of the sub-object classifier 114 to the inputs of the sub-object classifier 114. Similarly, the mask classifier 118 (e.g., ML head 308) predicts output 306 by applying the current state of the mask classifier 118 to the inputs of the mask classifier 118. Subsequently, each of the pixels in the predicted output 306 are compared using the comparator 310 to the actual output 318. In some embodiments, the actual output 318 is a sub-object of the masked object (determined using clustering as described herein, or obtained by the training module 230 using a data store for instance). The comparator 310 determines an amount of error or difference from the predicted output 306 to the actual output 318.

The error, represented by error signal 312, is used to adjust the weights in ML head 308 such that the ML head 308 changes (or learns). For example, the sub-object classifier (e.g., ML head 308) learns to predict which pixels of an object belong to a sub-object, and the mask classifier 118 (e.g., ML head 808) learns to predict which pixels of the object should be masked to distinguish one or more sub-objects. The error signal 312 may also be communicated back to the transformer module/pixel-level module of the sub-object segmentation model 150 such that the modules of the sub-object segmentation model 150 change (or learn) over time to predict more accurate features (e.g., image features, per segment embeddings, per pixel embeddings, mask embeddings, etc.).

Each of the ML heads 308 and the transformer module/pixel-level module of the sub-object segmentation model 150 are trained using the backpropagation algorithm. The backpropagation algorithm operates by propagating the error signal 312 through the ML head 308 and the transformer module/pixel-level module of the sub-object segmentation model 150. The error signal 312 may be calculated each iteration (e.g., each pair of training inputs 302 and associated actual outputs 318), batch, and/or epoch and propagated through all of the algorithmic weights in the ML head 308 and transformer module/pixel-level module of the sub-object segmentation model 150 such that the algorithmic weights adapted based on the amount of error. In some embodiments, depending on the input-output pair, the weights adjusted in ML head 308 differ. For example, weights in the ML head 308 are adjusted less if the training input was determined by the training module 230. For instance, the sub-object of a masked object is labeled using a pseudo label from clustering. In contrast, weights in the ML head 308 are adjusted more if the training input was obtained from a data store. For instance, the sub-object of the masked object is labeled according to a ground truth obtained from the data store. The error is minimized using a loss function. Non-limiting examples of loss functions may include the square error function, the root mean square error function, and the like.

Each ML head 308 is trained according to the error of the respective ML head 308. That is, the sub-object classifier 114 is trained according to the error signal 312 of the predicted sub-object label and the sub-object label (e.g., the ground truth or actual label indicating that a group of pixels belong to the same sub-object), and the mask classifier 118 is trained according to the error signal 312 of the predicted masked sub-object and an actual masked sub-object. The weighting coefficients of each ML head 308 are tuned to reduce the amount of error, thereby minimizing the differences between (or otherwise converging) the predicted output 306 with the actual output 318. The ML heads 308 are trained until the error determined by the comparator 310 is within a certain threshold (or a threshold number of batches, epochs, or iterations have been reached).

In addition to training the ML heads 308 and the backbone using supervised learning, the training module 230 can train the ML heads 308 using contrastive learning. For example, the training module 230 can train the ML heads 308 using supervised learning when the training module 230 has input-output pairs, as described herein. The training module 230 can train the ML heads 308 using contrastive learning when the training module 230 does not have input-output pairs. For example, the training module 230 can train the ML heads 308 using contrastive learning when clusters were determined by the training module 230 according to the features of objects/sub-objects. In some implementations, the training module 230 trains using supervised learning (or clustering) at a first point in time, and subsequently fine-tunes the ML heads 308 using clustering (or supervised learning) at a second point in time after the first point in time.

In other implementations, the training module 230 trains using both supervised learning and clustering, depending on whether the data includes labels (or other ground truth identifiers) or whether the data does not include labels. For instance, the training module 230 trains using supervised learning if the training input 302 applied to the backbone and ML head 308 is obtained from a corpus and includes a corresponding output (e.g., actual output 318). The training module 230 trains using contrastive learning if the training input 302 applied to the backbone and ML head 308 is determined via clustering. In some implementations, the training module 230 biases the learning such that the weights of the ML heads 308 are tuned more, responsive to supervised learning, and the weights of the ML heads are tuned less, responsive to contrastive learning. In other implementations, the training module 230 biases the learning such that training data incorporating a pseudo-label as an actual output 318 tunes the weights of the ML heads less than training data using ground truth or actual labels as actual output 318.

Contrastive learning is a mechanism of learning that utilizes self-supervised learning to minimize a distance (such as Euclidean distance) between similar samples in an embedding space and maximize a distance between dissimilar samples in the embedding space. Accordingly, an input sample (e.g., an anchor) is compared to a similar sample (resulting in a positive pair) and a dissimilar sample (resulting in a negative pair). Such pairs are called anchor-positive pairs and anchor-negative pairs respectively, and can be determined using unlabeled data (e.g., in a self-supervised manner). The sub-object classifier 114 and the mask classifier 118 learn features of sub-objects by learning features of similar sub-objects and distinguishing such features from unique (or dissimilar) sub-objects.

The training module 230 uses the clusters to determine positive and negative pairs for contrastive learning. For example, a positive pair may include a feature of a first cluster and a second feature belonging to the first cluster. A negative pair may include a feature of a first cluster and a second feature of a second cluster. The training module 230 may employ any one or more contrastive loss functions to train the sub-object classifier 114 and the mask classifier 118 to learn relationships that push similar features together (e.g., features of a same cluster, or features of a sub-object) and pull dissimilar features apart (e.g., features of different clusters). In this manner, the sub-object classifier 114 and the mask classifier 118 learn that pixels in similar clusters have similar features, while pixels in different clusters have different features. Example functions can include contrastive loss, triplet loss, lifted structure loss, N-pair loss, angular loss, divergence loss, and the like. As described herein, the training module 230 may also utilize the positive and negative pairs for supervised learning.

Figure 4:
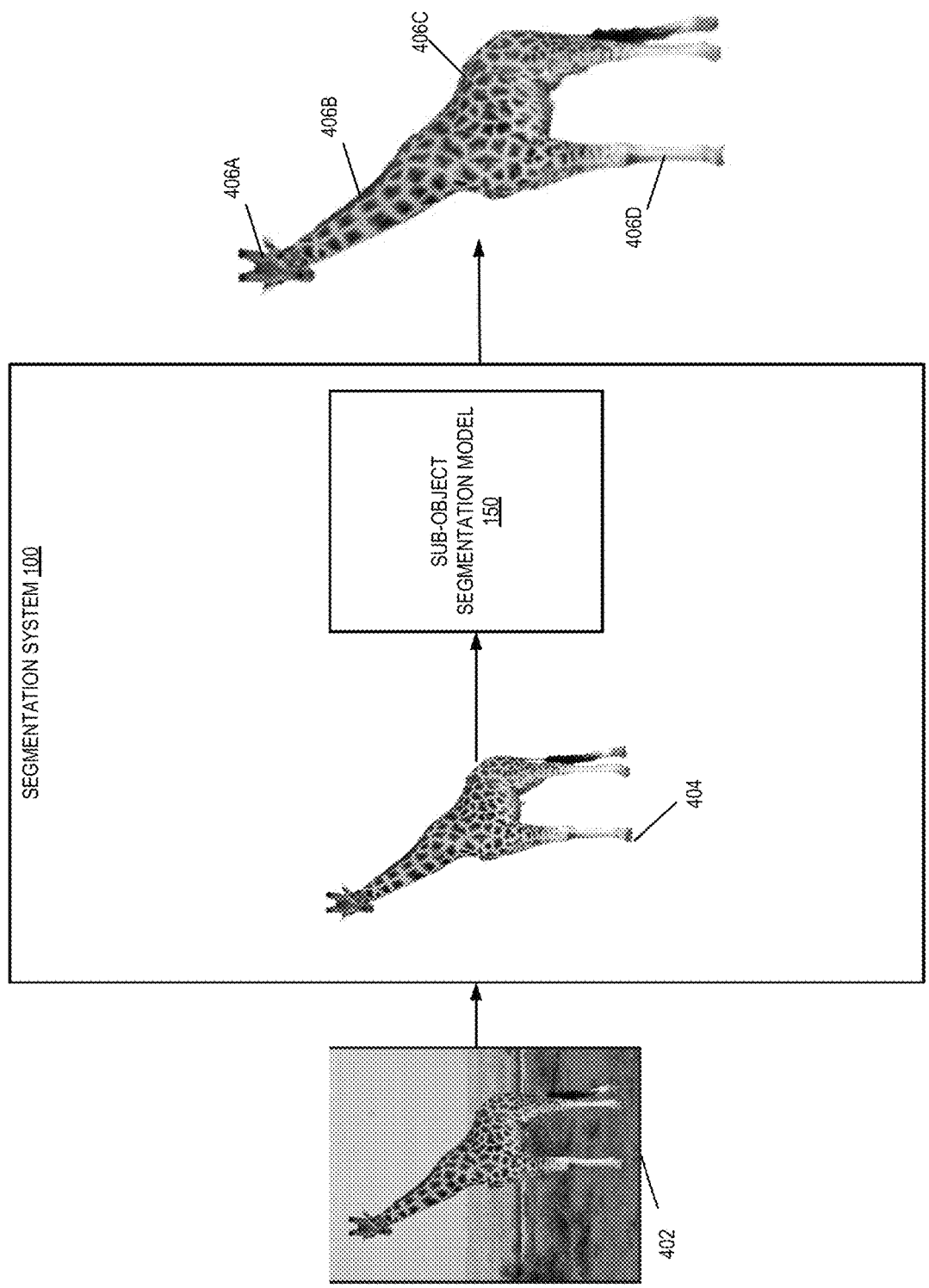
FIG. 4 illustrates an example of the inputs and outputs of the segmentation system, in accordance with one or more embodiments.

FIG. 4 illustrates an example of the inputs and outputs of the segmentation system, in accordance with one or more embodiments. As shown, the segmentation system receives an image 402. As described herein, in some embodiments, the segmentation system 402 may be configured to determine an object mask 404 of the image 402. In other embodiments, the segmentation system receives the object mask 404. The object mask 404 includes an object of interest reflected in the image 402. That is, the object mask 404 maintains the information of the image 402 while cropping out non-object information of the image 402. As shown, the object mask 404 is three channels such as red-green-blue that reflect the object in the image.

The object mask 404 is fed to the sub-object segmentation model 150. As described herein, the sub-object segmentation model 150 segments the object into one or more sub-objects. As shown, the object mask 404 has been segmented into four parts (e.g., 406A, 406B, 406C, and 406D). In some embodiments, the sub-object segmentation model 150 outputs a single masked sub-object. For example, a user may select the giraffe head (corresponding to sub-object 406A). As a result, the sub-object segmentation model 150 outputs only the giraffe head, or sub-object 406A.

Figure 5:
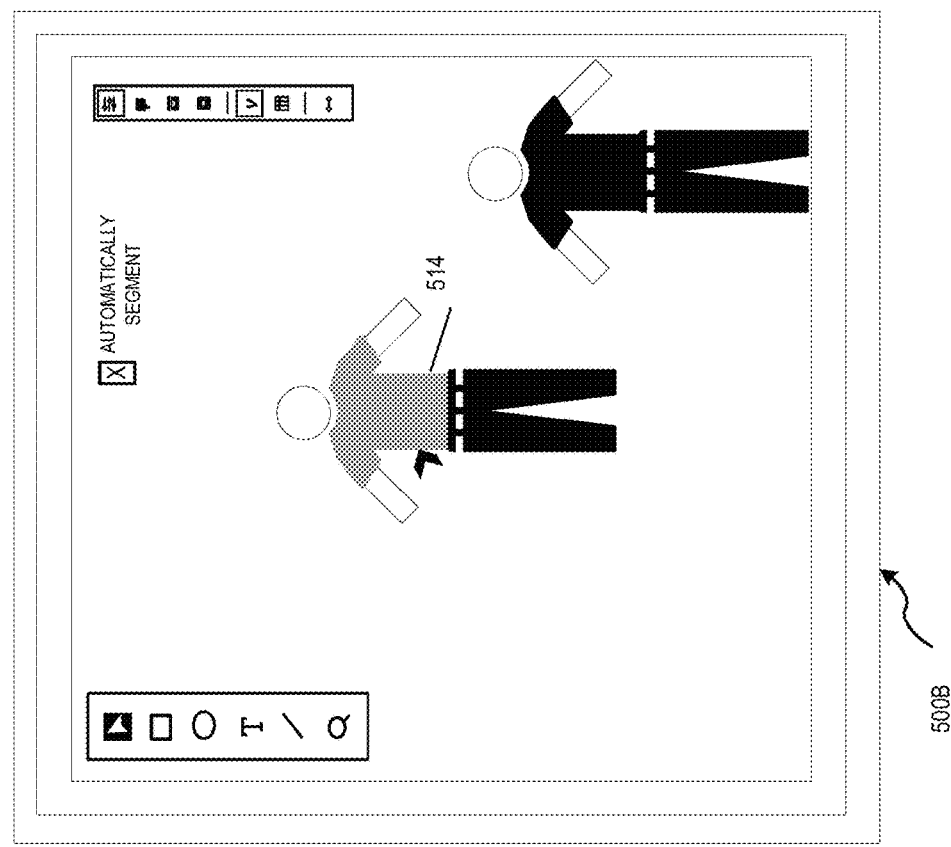
FIG. 5 illustrates an example of a user using the segmentation system, in accordance with one or more embodiments.
Figure 5:
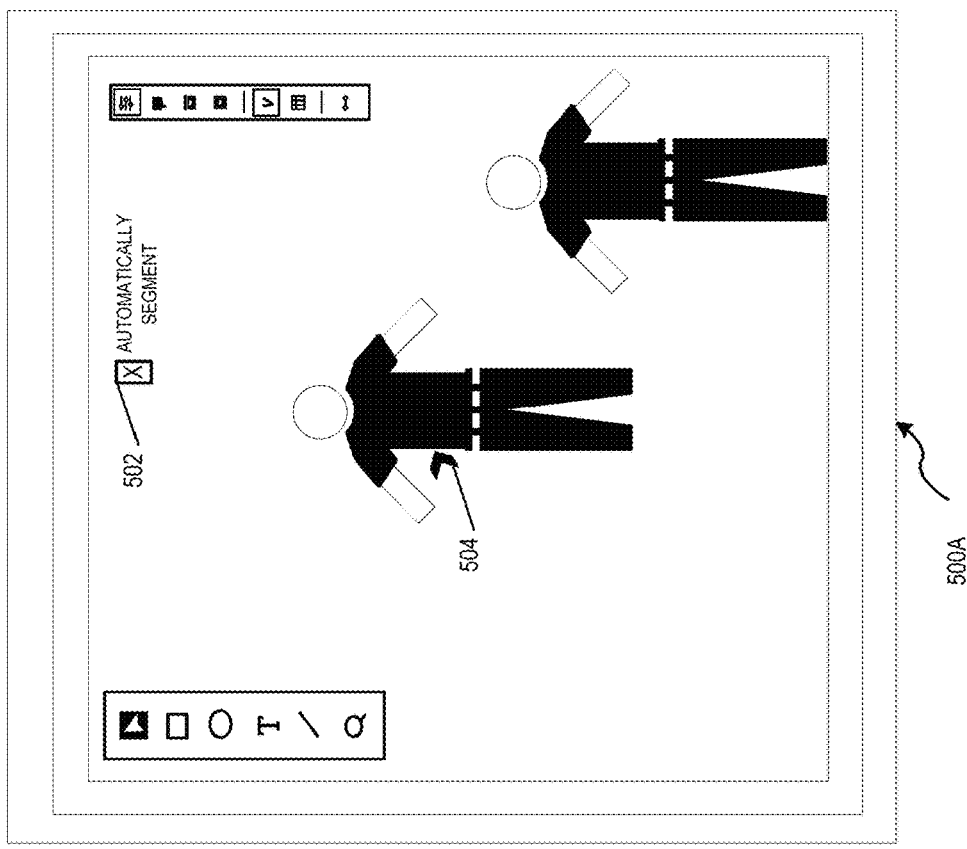

FIG. 5 illustrates an example of a user using the segmentation system, in accordance with one or more embodiments. As shown, a user is executing an application that calls or in some way communicates with the segmentation system. Specifically, in 500A, a user enables the segmentation system by interacting with button 502. While shown as a button there are various other ways to enable the segmentation system.

In a first non-limiting example, a user may interact with an object including a sub-object of interest (e.g., right clicking the object, hovering over the object, tapping the object with the user's finger, etc.). Subsequently, the segmentation system may identify sub-objects of the object. As illustrated in FIG. 4, the segmentation system may segment the entire object into sub-objects. Subsequently, the segmentation system may display the sub-objects to the user. The user may select a particular sub-object from the sub-objects of the object.

In another non-limiting example, the segmentation system may detect an event associated with the sub-object in the image. The detected event may include right clicking an object including the sub-object, hovering over the object, tapping the object with the user's finger, etc. In response to receiving the event, the segmentation system is triggered to generate a mask of the selected sub-object in the image.

As shown in 500A, the user interacts with a shirt of a person (e.g., a sub-object of an object of interest). As shown at 514 of 500B, the particular sub-object of the object is segmented. When the sub-object of the object of interest is segmented, the segmentation system overlays a visual indicator on the sub-object of interest. As shown, other shirts of other people in image 500B are not segmented.

Figure 6:
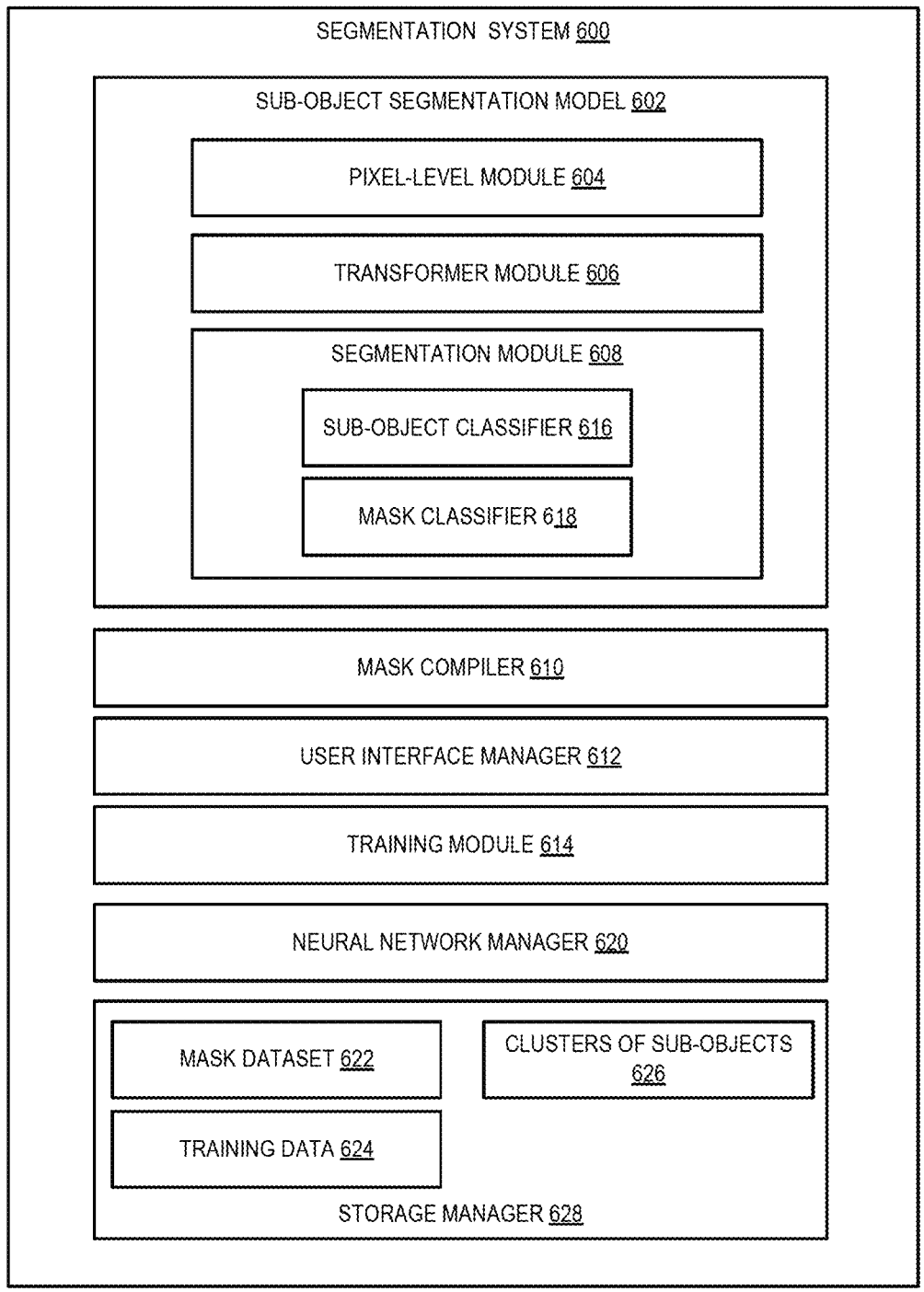
FIG. 6 illustrates a schematic diagram of segmentation system in accordance with one or more embodiments.

FIG. 6 illustrates a schematic diagram of segmentation system (e.g., "segmentation system" described above) in accordance with one or more embodiments. As shown, the segmentation system 600 may include, but is not limited to, a sub-object segmentation model 602 including a pixel-level module 604, a transformer module 606, and a segmentation module 608 including a sub-object classifier 616 and a mask classifier 618. The segmentation system 600 also includes a mask compiler 610, a user interface manager 612, a training module 614, a neural network manager 620, and a storage manager 628.

As illustrated in FIG. 6, the segmentation system 600 includes a sub-object segmentation model 602. The sub-object segmentation model 602 is a model including one or more other models (or sub-modules) trained to perform sub-object segmentation tasks. One sub-object segmentation task is performed by the pixel level module 604. The pixel-level module 604 extracts image features from an image and an object mask. As described herein, the object mask is a mask of an object of interest, where the object of interest includes one or more sub-objects selected by a user (e.g., sub-objects of interest). The pixel-level module 604 may also determine per-pixel embeddings. As described herein, the per-pixel embeddings are used as part of the input to the mask classifier 618 of the segmentation module 608. The image features are fed to the transformer module 606. The transformer module 606 determines per segment embeddings from the image features. Each segment embedding corresponds to a position of the embedding in an embedding space of the object of interest. One or more modules of the segmentation module 608 determine mask embeddings from the per-segment embeddings. The mask embeddings are used as the input to the sub-object classifier 616 and as part of the input for the mask classifier 618 of the segmentation module 608.

The segmentation module 608 is a model including one or more other models (or sub-modules) trained to perform sub-object segmentation tasks. Specifically, the segmentation module 608 segments sub-objects of the object of interest (e.g., the masked object received as an input). The sub-object classifier 616 uses the mask embeddings to classify sub-objects according to a generic label, instead of classifying sub-objects according to a ground truth label. For example, the sub-object classifier 616 may label parts of the object using an objectness score. The mask classifier 618 determines binary mask embeddings by masking (or classifying) each pixel in the object of interest as belonging to a sub-object of the object of interest. Specifically, the mask classifier 618 uses a dot product of the per-pixel embeddings (determined from the pixel-level module 604) and mask embeddings (determined from one or more modules of the segmentation module 608, such as an MLP for instance) to determine the binary mask embeddings.

As illustrated in FIG. 6, the segmentation system 600 also includes a mask compiler 610. The mask compiler 610 generates a mask understandable by humans using a dot product of the output of the sub-object classifier 616 and the mask classifier 618 (e.g., the class agnostic classification and binary mask embeddings respectively). In an example, the mask compiler 610 can display a mask understandable by humans by overlaying the masked sub-object with one or more visual indicators.

As illustrated in FIG. 6, the segmentation system 600 includes a user interface manager 612. The user interface manager 612 allows users to perform a gesture to indicate a sub-object of interest in an image. In some embodiments, the user interface manager 612 provides a user interface through which the user can upload the image including various objects/sub-objects. Alternatively, or additionally, the user interface may enable the user to download the images from a local or remote storage location (e.g., by providing an address (e.g., a URL or other endpoint) associated with an image source). In some embodiments, the user interface can enable a user to link an image capture device, such as a camera or other hardware to capture image data and provide it to the segmentation system 600.

Additionally, the user interface manager 612 allows users to perform one or more gestures to indicate a sub-object) of interest in the image. For example, the user interface manager 612 may record mouse movements, mouse compression/decompress (e.g., a mouse click), user interactions with a screen (e.g., haptic feedback), keyboard entries, and the like. The user interface manager 612 also enables the user to view a resulting output image including a masked sub-object of interest. The user is further able to refine and/or correct the masked sub-object of interest in the image.

As illustrated in FIG. 6, the segmentation system 600 also includes a training module 614. The training module 614 can teach, guide, tune, and/or train one or more neural networks. The training module 614 provides the sub-object classifier 616 and mask classifier 618 input-output pairs during training. As described with reference to FIG. 2, using supervised learning, the sub-object classifier 616 and mask classifier 618 are trained. Specifically, the error determined from the sub-object classifier 616 and mask classifier 618 is passed backwards to the pixel-level module 604 and the transformer module 606 using the backpropagation algorithm.

The training module 614 is also configured to generate data for use in input-output pairs during training. For example, the training module 614 clusters sub-objects in feature space creating pseudo labels for supervised learning. Additionally, the training module 614 can generate corrupt masked objects such that the sub-object classifier 616 and mask classifier 618 learn to robustly determine class agnostic classifications and binary mask embeddings respectively.

As illustrated in FIG. 6, the segmentation system 600 also includes a neural network manager 620. Neural network manager 620 may host a plurality of neural networks or other machine learning models, such as pixel-level module 604, transformer module 606, MLPs, sub-object classifier 616, mask classifier 618, and the like. The neural network manager 620 may include an execution environment, libraries, and/or any other data needed to execute the machine learning models. In some embodiments, the neural network manager 620 may be associated with dedicated software and/or hardware resources to execute the machine learning models. Although depicted in FIG. 6 as being hosted by a single neural network manager 620, in various embodiments the neural networks may be hosted in multiple neural network managers and/or as part of different components. For example, each module (e.g., pixel-level module 604, transformer module 606, MLPs, sub-object classifier 616, mask classifier 618) can be hosted by their own neural network manager, or other host environment, in which the respective neural networks execute. In other embodiments, groups of machine learning models may be executed by their own neural network manager or other host environment. Additionally, or alternatively, each machine learning model (or groups of machine learning models) may be spread across multiple neural network managers depending on, e.g., the resource requirements, traffic, lag, etc.

As illustrated in FIG. 6, the segmentation system 600 also includes the storage manager 628. The storage manager 628 maintains data for the segmentation system 600. The storage manager 628 can maintain data of any type, size, or kind as necessary to perform the functions of the segmentation system 600. For example, the storage manager 628, as shown in FIG. 6, includes the training data 624. As described herein, training data 624 can include input-output pairs such as masked objects and clusters of sub-objects. As described herein, the masked objects may be generated corrupt masks, masks obtained from one or more upstream processes, masks obtained from a data store, and the like. The storage manager 628 also stores mask datasets 622 including images of objects and corresponding masked sub-objects. Additionally or alternatively, the storage manager 628 may store addresses (e.g., memory addresses, URL addresses, MAC addresses, IP addresses, port addresses, etc.) in which to query mask dataset data from. In some implementations, the storage manager 628 stores clusters of sub-objects 626. As described herein, the training module 614 determines clusters representing sub-objects in feature space. The storage manager 628 may store centroids, similarity matrices, and the like associated with each cluster.

Each of the components of the segmentation system 600 and their corresponding elements (as shown in FIG. 6) may be in communication with one another using any suitable communication technologies. It will be recognized that although components and their corresponding elements are shown to be separate in FIG. 6, any of components and their corresponding elements may be combined into fewer components, such as into a single facility or module, divided into more components, or configured into different components as may serve a particular embodiment.

As described herein, the components of segmentation system 600 (and their corresponding elements) can comprise software, hardware, or both. For example, the components can comprise one or more instructions stored on a computer-readable storage medium and executable by processors of one or more computing devices. When executed by the one or more processors, the computer-executable instructions of the segmentation system 600 can cause a client device and/or a server device to perform the methods described herein. Alternatively, the components can comprise hardware, such as a special purpose processing device to perform a certain function or group of functions. Additionally, the components can comprise a combination of computer-executable instructions and hardware.

Furthermore, the components of the segmentation system 600 may, for example, be implemented as one or more stand-alone applications, as one or more modules of an application, as one or more plug-ins, as one or more library functions or functions that may be called by other applications, and/or as a cloud-computing model. Thus, the components of the segmentation system 600 may be implemented as a stand-alone application, such as a desktop or mobile application. Furthermore, the components of the segmentation system 600 may be implemented as one or more web-based applications hosted on a remote server. Alternatively, or additionally, the components of the segmentation system 600 may be implemented in a suite of mobile device applications or "apps."

As shown, the segmentation system 600 can be implemented as a single system. In other embodiments, the segmentation system 600 can be implemented in whole, or in part, across multiple systems. For example, one or more functions of the segmentation system 600 can be performed by one or more servers, and one or more functions of the segmentation system 600 can be performed by one or more client devices. The one or more servers and/or one or more client devices may generate, store, receive, and transmit any type of data used by the segmentation system 600, as described herein.

In one implementation, the one or more client devices can include or implement at least a portion of the segmentation system 600. In other implementations, the one or more servers can include or implement at least a portion of the segmentation system 600. For instance, the segmentation system 600 can include an application running on the one or more servers or a portion of the segmentation system 600 can be downloaded from the one or more servers. Additionally or alternatively, the segmentation system 600 can include a web hosting application that allows the client device(s) to interact with content hosted at the one or more server(s).

For example, upon a client device accessing a web application hosted at the one or more servers, the one or more service provide access to the segmentation system 600. In some embodiments, the client device is used to upload one or more digital images. In other embodiments, the one or more servers can provide access to one or more digital images. As described herein, a user uses the client device to select an object of interest in the image. The object of interest may contain one or more sub-objects of interest. Upon receiving the gesture performed by the user to select the object of interest, the one or more servers automatically perform the methods and process described above to predict segment the sub-object of interest in the selected object. The one or more servers communicate the image including the masked sub-object to the client device for display to the user.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 8. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks 'M08 will be discussed in more detail below with regard to FIG. 8.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 8.

Figure 7:
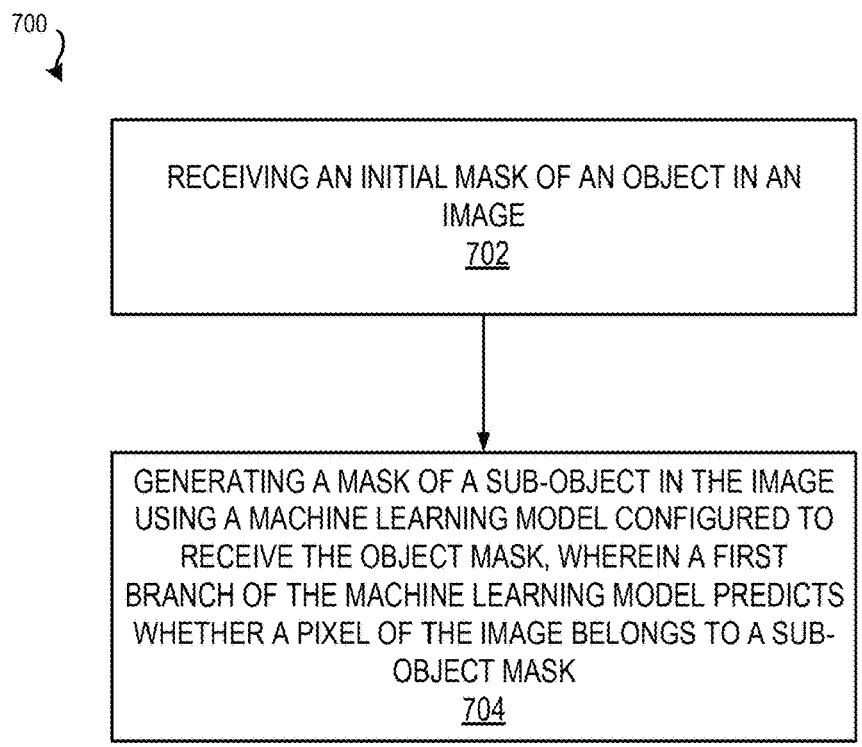
FIG. 7 illustrates a flowchart of a series of acts in a method of automatically generating a sub-object mask, in accordance with one or more embodiments.

FIGS. 1-6, the corresponding text, and the examples, provide a number of different systems and devices that facilitate for automatic sub-object segmentation. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with fewer or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart 700 of a series of acts in a method of automatically generating a sub-object mask, in accordance with one or more embodiments. In one or more embodiments, the method 700 is performed in a digital medium environment that includes the segmentation system 600. The method 700 is intended to be illustrative of one or more methods in accordance with the present disclosure and is not intended to limit potential embodiments. Alternative embodiments can include additional, fewer, or different steps than those articulated in FIG. 7.

As illustrated in FIG. 7, the method 700 includes an act 702 of receiving an object mask of an object in an image. The image may be a computer-generated image, a frame of a video, a picture captured by a camera (or other sensor), a bitmap, and the like. The image may include objects, each object including one or more sub-objects (or parts of the object). The object mask is a mask of a particular object of interest in an image. In some embodiments, the object mask captures the object in the image. For example, the object mask may be three channels such as red-green-blue that reflect the object in the image.

As illustrated in FIG. 7, the method 700 includes an act 704 of generating a mask of a sub-object in the image using a machine learning model configured to receive the object mask, wherein a first branch of the machine learning model predicts whether a pixel of the image belongs to a sub-object. The machine learning model may be a modified mask2former model or other machine learning architecture. The machine learning model may operate using multiple heads, or branches, such that each head of the machine learning model is trained to perform a task. In some embodiments, a first branch of the machine learning model is a mask classifier. The mask classifier of the machine learning model is trained to predict a likelihood of a pixel of the image belonging to a sub-object mask. Specifically, the mask classifier determines binary mask embeddings by masking (or classifying) each pixel in the object of interest as belonging to a sub-object of the object of interest. In some embodiments, the machine learning model has a second branch. The second branch may be a sub-object classifier trained to predict a likelihood of the pixel of the image belonging to a sub-object using an objectness score.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
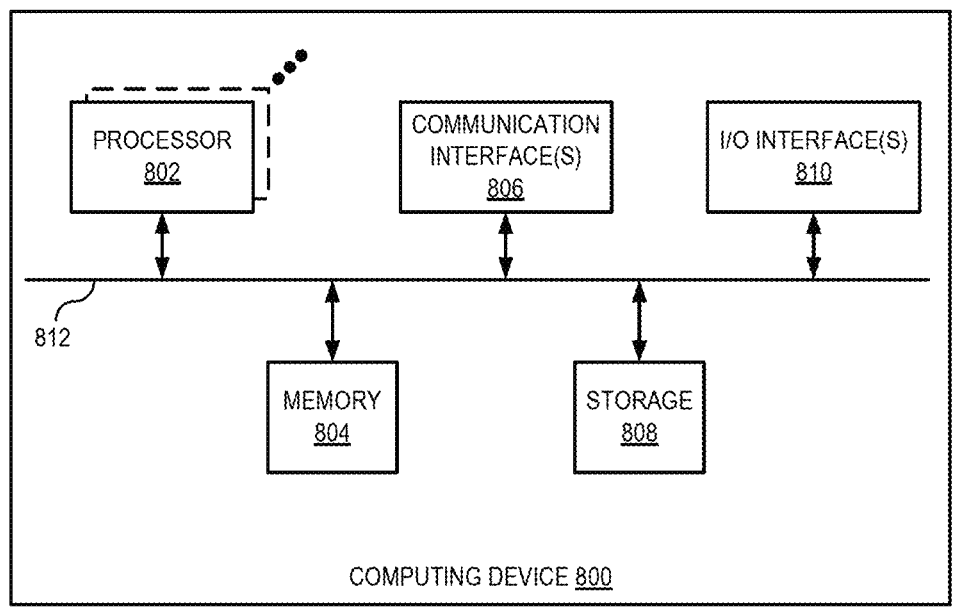
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the segmentation system. As shown by FIG. 8, the computing device can comprise a processor 802, memory 804, one or more communication interfaces 806, a storage device 808, and one or more I/O devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination these or other storage devices. The computing device 800 also includes one or more input or output ("I/O") devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
receiving an object mask of an object in an image; and
generating a mask of a sub-object in the image using a machine learning model configured to receive the object mask, wherein a first branch of the machine learning model predicts a likelihood of a pixel of the image belonging to a sub-object mask, wherein a second branch of the machine learning model predicts a likelihood of the pixel of the image belonging to the sub-object.

2. The method of claim 1, further comprising:
executing a clustering technique to cluster a plurality of features of the image into one or more clusters, wherein the one or more clusters correspond to one or more sub-objects of the object.

3. The method of claim 2, wherein the machine learning model is trained using pseudo labels associated with each of the one or more clusters, the pseudo labels being used as a class agnostic label.

4. The method of claim 1, further comprising:
overlaying a visual indicator over the sub-object, the overlayed visual indicator corresponding to the mask of the sub-object; and
displaying the overlayed visual indicator over the sub-object.

5. The method of claim 1, further comprising:
displaying a plurality of sub-objects of the object; and
receiving a selection of a sub-object from the plurality of sub-objects.

6. The method of claim 1, further comprising:
detecting an event associated with the sub-object in the image; and
triggering, in response to the event, the machine learning model to generate the mask of the sub-object.

7. A system comprising:
a memory component; and
a processing device coupled to the memory component, the processing device to perform operations comprising:
receiving an object mask of an object in an image; and
generating a mask of a sub-object in the image using a machine learning model configured to receive the object mask, wherein a first branch of the machine learning model predicts a likelihood of a pixel of the image belonging to the sub-object, wherein a second branch of the machine learning model predicts a likelihood of the pixel of the image belonging to a sub-object mask.

8. The system of claim 7, wherein the processing device performs further operations comprising:
executing a clustering technique to cluster a plurality of features of the image into one or more clusters, wherein the one or more clusters correspond to one or more sub-objects of the object.

9. The system of claim 8, wherein the machine learning model is trained using pseudo labels associated with each of the one or more clusters, the pseudo labels being used as a class agnostic label.

10. The system of claim 7, wherein the processing device performs further operations comprising:
overlaying a visual indicator over the sub-object, the overlayed visual indicator corresponding to the mask of the sub-object; and
displaying the overlayed visual indicator over the sub-object.

11. The system of claim 7, wherein the processing device performs further operations comprising:
displaying a plurality of sub-objects of the object; and
receiving a selection of a sub-object from the plurality of sub-objects.

12. The system of claim 7, wherein the processing device performs further operations comprising:
detecting an event associated with the sub-object in the image; and
triggering, in response to the event, the machine learning model to generate the mask of the sub-object.

13. A non-transitory computer-readable medium storing executable instructions, which when executed by a processing device, cause the processing device to perform operations comprising:
receiving an object mask of an object in an image;
predicting, by a first branch of a machine learning model, a likelihood of a pixel of the image belonging to a sub-object mask;
predicting, by a second branch of the machine learning model, a likelihood of the pixel of the image belonging to a sub-object using an objectness score; and
determining, using the likelihood of the pixel of the image belonging to the sub-object mask and the likelihood of the pixel of the image belonging to the sub-object, a mask of the sub-object.

14. The non-transitory computer-readable medium of claim 13, storing instructions that further cause the processing device to perform operations comprising:
executing a clustering technique in a feature space to cluster a plurality of features of the image into one or more clusters, wherein the one or more clusters correspond to one or more sub-objects of the object.

15. The non-transitory computer-readable medium of claim 14, wherein the feature space is an image feature space determined by a pixel-level module, a per segment embedding space determined by a transformer module, a per pixel embedding space determined by the pixel-level module, or a mask embedding space, determined by a multi layer perceptron.

16. The non-transitory computer-readable medium of claim 14, wherein the machine learning model is trained using pseudo labels associated with each of the one or more clusters, the pseudo labels being used as a class agnostic label.

17. The non-transitory computer-readable medium of claim 16, wherein training further includes:
adjusting an error of the machine learning model by a first amount responsive to a pseudo label being received as a training input; and
adjusting the error of the machine learning model by a second amount responsive to a ground truth label being received as the training input.

18. The non-transitory computer-readable medium of claim 13, wherein:
overlaying a visual indicator over the sub-object, the overlayed visual indicator corresponding to the mask of the sub-object; and
displaying the overlayed visual indicator over the sub-object.

* * * * *